US010401905B2

(12) United States Patent
Carnevali (10) Patent No.: US 10,401,905 B2
(45) Date of Patent: Sep. 3, 2019

(54) SLIDE DOCK AND METHODS OF MAKING AND USING

(71) Applicant: National Products, Inc., Seattle, WA (US)

(72) Inventor: Jeffrey D. Carnevali, Seattle, WA (US)

(73) Assignee: NATIONAL PRODUCTS, INC., Seattle, WA (US)

( * ) Notice: Subject to any disclaimer, the term of this patent is extended or adjusted under 35 U.S.C. 154(b) by 0 days.

(21) Appl. No.: 15/632,867

(22) Filed: Jun. 26, 2017

(65) Prior Publication Data

US 2017/0371374 A1  Dec. 28, 2017

Related U.S. Application Data (60) Provisional application No. 62/355,226, filed on Jun. 27, 2016.

(51) Int. Cl.
*G06F 1/16* (2006.01)
*G06F 13/38* (2006.01)
*H04M 1/04* (2006.01)

(52) U.S. Cl.
CPC .......... *G06F 1/1632* (2013.01); *G06F 1/1626* (2013.01); *G06F 1/16* (2013.01); *G06F 13/385* (2013.01); *H04M 1/04* (2013.01)

(58) Field of Classification Search
CPC ............... G06F 1/1632; G06F 1/16; G06F 1/181–1/187; G06F 1/1622; G06F 1/1626; G06F 13/385; H05K 5/02; H05K 7/14; H05K 7/16; H05K 5/0239; H05K 5/0247; H05K 7/1474; H04M 1/04
USPC ............... 361/679.01, 679.3, 679.4–679.44, 361/679.55–679.57, 724–727; 312/223.1–223.3
See application file for complete search history.

(56) References Cited

U.S. PATENT DOCUMENTS

| 809,977 A | 1/1906 | O'Brien |
| 1,786,459 A | 7/1926 | Simons |
| 2,495,552 A | 1/1950 | Schmitz |
| 2,549,917 A | 4/1951 | Millbrandt |
| 2,565,939 A | 8/1951 | Wriston |

(Continued)

FOREIGN PATENT DOCUMENTS

| WO | 2013/081222 | 6/2013 |
| WO | 2015/127376 | 8/2015 |

OTHER PUBLICATIONS

STIC Search Report (Year: 2019).*

(Continued)

*Primary Examiner* — Steven T Sawyer
*Assistant Examiner* — Sagar Shrestha
(74) *Attorney, Agent, or Firm* — Lowe Graham Jones PLLC; Bruce E. Black (57) ABSTRACT

A dock for a portable electronic device includes a base; an arm extending from the base; a receiving arrangement coupled to the arm and including contacts disposed on a surface of the receiving arrangement for mating with contacts disposed on the portable electronic device or a cover disposed over a portion of the portable electronic device; and a cable extending from the receiving arrangement configured and arranged to couple the dock to a device for charging or providing data to or from the portable electronic device.

20 Claims, 7 Drawing Sheets

(56) References Cited

U.S. PATENT DOCUMENTS

| | | | |
|---|---|---|---|
| 2,612,947 A | 10/1952 | Jenks | |
| 2,717,093 A | 9/1955 | Mautner | |
| 2,803,368 A | 8/1957 | Koch | |
| 3,018,525 A | 1/1962 | Deisenroth | |
| 3,140,883 A | 7/1964 | Anthony | |
| 3,464,579 A | 9/1969 | Asenbauer | |
| 3,667,648 A | 6/1972 | Koziol | |
| 3,885,701 A | 5/1975 | Becklin | |
| 3,972,459 A | 8/1976 | Cooper | |
| 3,978,830 A | 9/1976 | Toth, Jr. | |
| 4,298,204 A | 11/1981 | Jinkins | |
| 4,564,880 A | 1/1986 | Christ et al. | |
| 4,602,829 A * | 7/1986 | De Andrea | H05K 7/1425 |
| | | | 211/41.17 |
| 4,607,772 A | 8/1986 | Hancock | |
| 4,828,558 A | 5/1989 | Kelman | |
| 4,842,174 A | 6/1989 | Sheppard et al. | |
| 4,848,319 A | 7/1989 | Appeldorn | |
| 5,002,184 A | 3/1991 | Lloyd | |
| 5,096,317 A | 3/1992 | Phillippe | |
| 5,135,189 A | 8/1992 | Ghazizadeh | |
| 5,246,133 A | 9/1993 | James | |
| 5,272,771 A | 12/1993 | Ansell et al. | |
| 5,295,602 A | 3/1994 | Swanson | |
| 5,353,934 A | 10/1994 | Yamauchi | |
| 5,461,717 A * | 10/1995 | Notarianni | G06F 1/1632 |
| | | | 361/727 |
| 5,535,274 A | 7/1996 | Braitberg et al. | |
| 5,584,054 A | 12/1996 | Tyneski et al. | |
| 5,586,002 A | 12/1996 | Notarianni | |
| 5,641,065 A | 6/1997 | Owens et al. | |
| 5,646,649 A | 7/1997 | Iwata et al. | |
| 5,791,506 A | 8/1998 | Sheffler et al. | |
| 5,813,096 A | 9/1998 | Soennichsen | |
| 5,822,427 A | 10/1998 | Braitberg et al. | |
| 5,842,670 A | 12/1998 | Nigoghosian | |
| 5,845,885 A | 12/1998 | Carnevali | |
| 5,860,550 A | 1/1999 | Miller et al. | |
| 5,895,018 A | 4/1999 | Rielo | |
| 5,953,795 A | 9/1999 | Bauer | |
| 5,969,057 A | 10/1999 | Schoeley et al. | |
| 5,990,874 A | 11/1999 | Tsumura et al. | |
| 5,992,807 A | 11/1999 | Tarulli | |
| 6,009,601 A | 1/2000 | Kaufman | |
| 6,010,005 A | 1/2000 | Rearms et al. | |
| 6,032,910 A | 3/2000 | Richter | |
| 6,034,505 A | 3/2000 | Arthur et al. | |
| 6,035,800 A | 3/2000 | Clifford | |
| 6,043,626 A | 3/2000 | Snyder et al. | |
| 6,068,119 A | 5/2000 | Derr et al. | |
| 6,149,116 A | 11/2000 | Won | |
| 6,273,773 B1 | 8/2001 | Bourke | |
| 6,276,552 B1 | 8/2001 | Vervisch | |
| 6,295,198 B1 | 9/2001 | Loh et al. | |
| 6,341,218 B1 | 1/2002 | Poplawsky et al. | |
| 6,356,053 B1 | 3/2002 | Sandoz et al. | |
| 6,377,825 B1 | 4/2002 | Kennedy et al. | |
| 6,406,758 B1 | 6/2002 | Bottari et al. | |
| 6,407,860 B1 | 6/2002 | Funazaki et al. | |
| 6,572,176 B2 | 6/2003 | Davis et al. | |
| 6,585,212 B2 | 7/2003 | Carnevali | |
| 6,588,637 B2 | 7/2003 | Gates et al. | |
| 6,597,924 B1 | 7/2003 | Smith | |
| 6,614,423 B1 | 9/2003 | Wong et al. | |
| 6,646,864 B2 | 11/2003 | Richardson | |
| 6,648,376 B2 | 11/2003 | Christianson | |
| 6,687,516 B2 | 2/2004 | Chen | |
| 6,702,604 B1 | 3/2004 | Moscovitch | |
| 6,762,585 B2 | 7/2004 | Liao | |
| 6,776,422 B1 | 8/2004 | Toy | |
| 6,785,566 B1 | 8/2004 | Irizarry | |
| 6,785,567 B2 | 8/2004 | Kato | |
| 6,816,713 B2 | 11/2004 | Chen | |
| 6,842,171 B2 | 1/2005 | Richter et al. | |
| 6,953,126 B2 | 10/2005 | Parker et al. | |
| 6,984,680 B2 | 1/2006 | Quinn | |
| 6,995,976 B2 | 2/2006 | Richardson | |
| 7,017,243 B2 | 3/2006 | Carnevali | |
| 7,031,148 B1 | 4/2006 | Lin | |
| 7,068,783 B2 | 6/2006 | Peiker | |
| 7,158,376 B2 | 1/2007 | Richardson et al. | |
| 7,180,735 B2 | 2/2007 | Thomas et al. | |
| 7,230,823 B2 | 6/2007 | Richardson et al. | |
| 7,248,901 B2 | 7/2007 | Peiker | |
| 7,257,429 B2 | 8/2007 | Kogan | |
| 7,283,849 B2 | 10/2007 | Peiker | |
| 7,311,526 B2 | 12/2007 | Rohrbach et al. | |
| 7,312,984 B2 | 12/2007 | Richardson et al. | |
| 7,351,066 B2 | 4/2008 | DiFonzo et al. | |
| 7,464,814 B2 | 12/2008 | Carnevali | |
| 7,480,138 B2 | 1/2009 | Kogan et al. | |
| 7,517,222 B2 | 4/2009 | Rohrbach et al. | |
| 7,520,389 B2 | 4/2009 | Lalouette | |
| 7,551,458 B2 | 6/2009 | Carnevali | |
| 7,594,576 B2 | 9/2009 | Chen et al. | |
| 7,609,512 B2 | 10/2009 | Richardson et al. | |
| 7,612,997 B1 | 11/2009 | Diebel et al. | |
| 7,641,477 B2 | 1/2010 | DiFonzo et al. | |
| 7,645,143 B2 | 1/2010 | Rohrbach et al. | |
| 7,663,879 B2 | 2/2010 | Richardson et al. | |
| 7,688,580 B2 | 3/2010 | Richardson et al. | |
| 7,812,567 B2 | 10/2010 | Shen | |
| 7,850,032 B2 | 12/2010 | Carnevali et al. | |
| 7,889,489 B2 | 2/2011 | Richardson et al. | |
| 7,889,494 B2 * | 2/2011 | Stampfli | A45F 5/00 |
| | | | 224/663 |
| 7,901,216 B2 | 3/2011 | Rohrbach et al. | |
| 7,907,394 B2 | 3/2011 | Richardson et al. | |
| 8,061,516 B2 | 11/2011 | Carnevali | |
| 8,074,951 B2 | 12/2011 | Carnevali | |
| 8,087,939 B2 | 1/2012 | Rohrbach et al. | |
| 8,099,138 B2 | 1/2012 | Piekarz | |
| 8,177,560 B2 | 5/2012 | Rohrbach et al. | |
| 8,183,825 B2 | 5/2012 | Sa | |
| 8,435,042 B2 | 5/2013 | Rohrbach et al. | |
| 8,453,835 B2 | 6/2013 | So | |
| 8,497,753 B2 | 7/2013 | DiFonzo et al. | |
| 8,690,582 B2 | 4/2014 | Rohrbach et al. | |
| 8,729,854 B2 | 5/2014 | Tsai et al. | |
| 8,801,441 B2 | 8/2014 | Zhang et al. | |
| 8,825,123 B1 | 9/2014 | Gudino | |
| 8,911,246 B2 | 12/2014 | Carnevali | |
| 8,929,065 B2 | 1/2015 | Williams | |
| 8,950,717 B2 | 2/2015 | Chuang | |
| 8,970,332 B2 | 3/2015 | DiFonzo et al. | |
| 9,072,172 B2 | 6/2015 | Hsu | |
| 9,112,304 B2 | 8/2015 | Rohrbach et al. | |
| 9,123,935 B2 | 9/2015 | Huang | |
| 9,172,781 B1 | 10/2015 | Goldstein | |
| 9,195,270 B2 | 11/2015 | Liu | |
| 9,195,279 B2 | 11/2015 | Carnevali et al. | |
| 9,331,444 B2 | 5/2016 | Carnevali | |
| 9,665,135 B2 * | 5/2017 | Wong | G06F 1/182 |
| 2004/0108348 A1 | 6/2004 | Barnes | |
| 2005/0110461 A1 * | 5/2005 | McConnell | G09B 7/00 |
| | | | 320/116 |
| 2005/0189354 A1 | 9/2005 | Heather et al. | |
| 2006/0090909 A1 * | 5/2006 | Carter | G07F 19/20 |
| | | | 172/111 |
| 2006/0175766 A1 | 8/2006 | Carnevali | |
| 2007/0263348 A1 * | 11/2007 | Rutledge | G06F 1/1632 |
| | | | 361/679.01 |
| 2008/0106870 A1 * | 5/2008 | Dully | G06F 1/1632 |
| | | | 361/724 |
| 2008/0232061 A1 * | 9/2008 | Wang | G06F 1/1632 |
| | | | 361/679.41 |
| 2009/0016008 A1 * | 1/2009 | Hock | G06F 1/1632 |
| | | | 361/679.4 |
| 2009/0314400 A1 | 12/2009 | Liu | |
| 2010/0134984 A1 * | 6/2010 | Lum | G06F 1/1632 |
| | | | 361/725 |
| 2011/0193524 A1 * | 8/2011 | Hazzard | G06F 1/1632 |
| | | | 320/114 |

(56) References Cited

U.S. PATENT DOCUMENTS

| | | | |
|---|---|---|---|
| 2012/0043235 A1 | 2/2012 | Klement | |
| 2012/0057278 A1* | 3/2012 | Fu | F16M 11/105 |
| | | | 361/679.01 |
| 2012/0065030 A1* | 3/2012 | Sandvig | A63B 21/0442 |
| | | | 482/79 |
| 2012/0118773 A1 | 5/2012 | Rayner | |
| 2012/0211382 A1 | 8/2012 | Rayner | |
| 2012/0250270 A1 | 10/2012 | Liu | |
| 2012/0261306 A1 | 10/2012 | Richardson et al. | |
| 2012/0298536 A1 | 11/2012 | Rauta et al. | |
| 2013/0058021 A1* | 3/2013 | Numata | G06F 1/1632 |
| | | | 361/679.01 |
| 2013/0058036 A1* | 3/2013 | Holzer | G06F 1/1632 |
| | | | 361/679.44 |
| 2013/0092576 A1 | 4/2013 | Rayner | |
| 2013/0106353 A1 | 5/2013 | Foster | |
| 2013/0193006 A1 | 8/2013 | Bergreen et al. | |
| 2013/0220841 A1 | 8/2013 | Yang | |
| 2013/0258573 A1 | 10/2013 | Muday et al. | |
| 2013/0273983 A1 | 10/2013 | Hsu | |
| 2013/0277520 A1* | 10/2013 | Funk | F16M 13/02 |
| | | | 248/274.1 |
| 2013/0331156 A1 | 12/2013 | Lui | |
| 2013/0334071 A1 | 12/2013 | Carnevali | |
| 2014/0191707 A1* | 7/2014 | Carreon | H04M 1/04 |
| | | | 320/107 |
| 2014/0268582 A1* | 9/2014 | Wong | G06F 1/16 |
| | | | 361/727 |
| 2014/0355200 A1* | 12/2014 | Thiers | H04W 88/02 |
| | | | 361/679.41 |
| 2015/0137738 A1* | 5/2015 | Chien | H02J 7/0021 |
| | | | 320/107 |
| 2015/0146401 A1 | 5/2015 | Su et al. | |
| 2015/0189780 A1 | 7/2015 | Su et al. | |
| 2015/0301561 A1 | 10/2015 | Carnevali | |
| 2015/0358439 A1 | 12/2015 | Carnevali | |
| 2016/0065702 A1 | 3/2016 | Carnevali | |
| 2016/0070300 A1 | 3/2016 | Carnevali et al. | |
| 2016/0218535 A1* | 7/2016 | Prete | H02J 7/0044 |

OTHER PUBLICATIONS

Otterbox Product directory, 20 pages of product description of Otter Box waterproof boxes retrieved from web site at: www.otterbox.com Dated Sep. 2, 2005. Otter Products, LLC, Bldg. 1 Old-Town Square, Suite 303, Fort Collins, CO 80524 Phone: 1-888-695-8820, 970-493-8446; Facsimile: 1-888-695-8827, 970-493-1755.

Officeonthego.com, 3 pages of product description of Magnifico ®PLUS screen magnifier product information retrieved from web site at: www.officeonthego.com.

2 pages of product information for Armor 1600 and Armor 1601 waterproof, dustproof and airtight protective cases.

2 pages Otterox 4600 Tablet PC Case protective cases product information retrieved from web site at: www.otterbox.com.

International Search Report and Written Opinion for PCT/US2017/039245 dated Sep. 13, 2017.

* cited by examiner

SLIDE DOCK AND METHODS OF MAKING AND USING

CROSS-REFERENCE TO RELATED APPLICATIONS

This patent application claims the benefit of U.S. Provisional Patent Application Ser. No. 62/355,226, filed Jun. 27, 2016, which is incorporated herein by reference.

BACKGROUND OF THE INVENTION

Portable devices, such as cell phones, tablets, and laptops, are ubiquitous. In many instances, multiple similar devices may be used and distributed to employees, customers, or the like. Manually plugging in these devices takes time and, over time, results in charging cable damage and breakage. Moreover, when manually charging a large bank of devices, replacing broken cables can be expensive and time consuming.

SUMMARY OF THE INVENTION

One embodiment is a dock for a portable electronic device. The dock includes a base; an arm extending from the base; a receiving arrangement coupled to the arm and including contacts disposed on a surface of the receiving arrangement for mating with contacts disposed on the portable electronic device or a cover disposed over a portion of the portable electronic device; and a cable extending from the receiving arrangement configured and arranged to couple the dock to a device for charging or providing data to or from the portable electronic device.

In at least some embodiments, the base includes at least one guide for guiding alignment of the portable electronic device with the receiving arrangement. In at least some embodiments, wherein the receiving arrangement is movable along the arm. In at least some embodiments, the arm includes a ratcheting track to facilitate locking of the receiving arrangement to the arm. In at least some embodiments, the arm includes numbering along the ratcheting track.

In at least some embodiments, the receiving arrangement is rotatable relative to the arm between at least two positions. In at least some embodiments, the receiving arrangement includes a recessed rim around the contacts. In at least some embodiments, the receiving arrangement includes at least one magnet configured and arranged to facilitate alignment and coupling of the portable electronic device to the dock. In at least some embodiments, the receiving arrangement includes at least one guide to facilitate alignment of the portable electronic device with the contacts of the receiving arrangement.

In at least some embodiments, the base includes at least one extension for coupling to an opening in a surface to which the base is to be attached. In at least some embodiments, the base includes at least one magnet to facilitate coupling the base to a surface. In at least some embodiments, the base includes two opposing guides for guiding and alignment of the portable electronic device.

In at least some embodiments, the dock further includes a light configured and arranged to indicate at least one of the following conditions: a) a portable electronic device is correctly docked in the slide dock; b) the portable electronic device is charging; c) the portable electronic device is sending data through the slide dock; or d) the portable electronic device is receiving data through the slide dock. In at least some embodiments, the light is unlit when there is no portable electronic device in the dock.

Another embodiment is a storage and charging system for a plurality of portable electronic devices. The storage and charging system includes a plurality of any of the docks described above arranged in at least one row.

In at least some embodiments, the plurality of the docks is arranged in two dimensional array. In at least some embodiments, the storage and charging system further includes a housing for the plurality of docks. In at least some embodiments, the housing is a cart, cupboard, or cabinet. In at least some embodiments, the housing includes at least one shelf and each of the docks includes at least one extension to engage the at least one shelf. In at least some embodiments, the storage and charging system further includes a plurality of portable electronic devices configured and arranged to be received by the docks and charged using the docks.

DETAILED DESCRIPTION OF PREFERRED EMBODIMENT

The slide docks described herein are useful for docking portable electronic devices, such as cell phones, smartphone, tablets, personal digital assistants, portable computers, and the like for charging, data transfer, or any combination thereof. The slide docks are particularly useful for docking portable electronic devices which are disposed within one of the covers described in U.S. Pat. Nos. 9,195,270 and 9,331,444; U.S. Patent Applications Publications Nos. 2016/

0065702; 2015/0358439; 2015/0301561; and 2016/0070300; and PCT Patent Application Publication No. WO 2015/127376, all of which are incorporated herein by reference, or a similar cover that includes contacts on the exterior of the cover that can mate with contacts of the slide dock, as described in more detail below. The slide docks may also be used with other portable electronic devices with or without covers (including conventional covers).

Figure 1A:
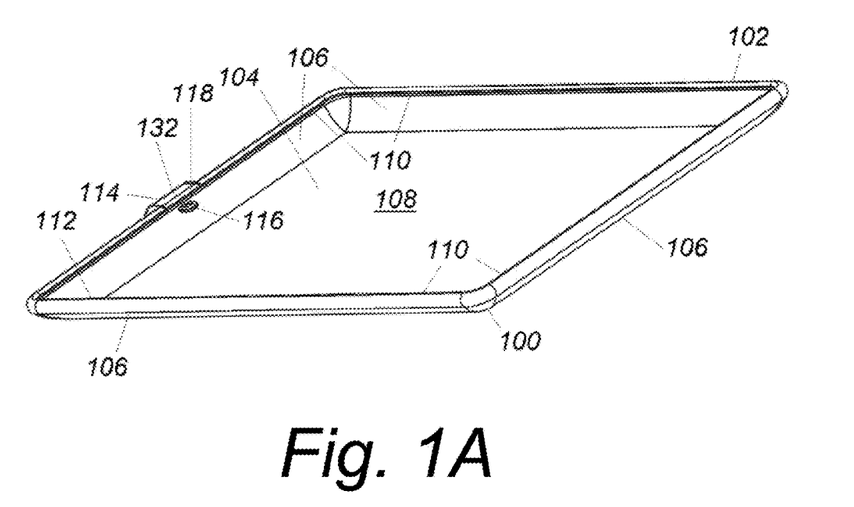
FIG. 1A is a side perspective view of one embodiment of a cover for a portable electronic device.
Figure 1B:
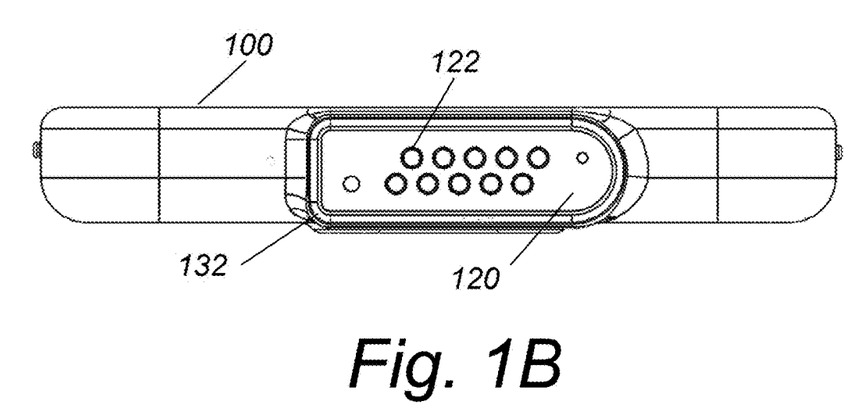
FIG. 1B is an end view of one embodiment of a contactor of the cover of FIG. 1A.

The covers fit over mobile devices, such as smart phones, tablets, personal digital assistants, portable computers, and the like. FIGS. 1A and 1B illustrate one example of a cover 100. Protective cover 100 is complimentary in shape to a portable electronic device. Protective cover 100 is shown being formed of a flexible unitary protective shell 102 having a flexible center panel 104 surrounded by an integral flexible side skirt 106. Panel 104 and skirt 106 combine to form an interior cavity 108 therebetween that is sized to at least partially cover the side faces and one of the front and back faces of portable electronic device 1, and to further extend around a peripheral edge of an opposite one of the front and back faces of portable electronic device 1. A continuous integral lip 110 extends inward of side skirt 106 and forms a mouth opening 112 that communicates with cavity 108. Mouth opening 112 is sized to receive electronic device 1 therethrough into cavity 108.

Protective cover 100 includes an adapter 114 that is fixedly positioned in side skirt 106. For example, adapter 114 is either over molded, bonded or fastened through side skirt 106. Adapter 114 is formed of a male plug 116 having a plurality of electrical connectors 118 that extend into cavity 108 of shell 102 in an arrangement for mating with a female input/output socket of the portable electronic device. Adapter 114 also includes a contactor 120 having a plurality of electrical contacts 122 that are spaced away from male plug 116 at an opposite end of adapter 114. Thus, while male plug 116 is extended into cavity 108 of shell 102, contactor 120 and its contacts 122 are positioned adjacent to an exterior of shell 102, whereby plurality of electrical contacts are exposed for connection to electrical contacts of the modular charge described herein. An optional dam 132 is formed in outer surface 124 of the protective shell 102. Further details regarding the cover are provided in the references cited above.

Figure 2A:
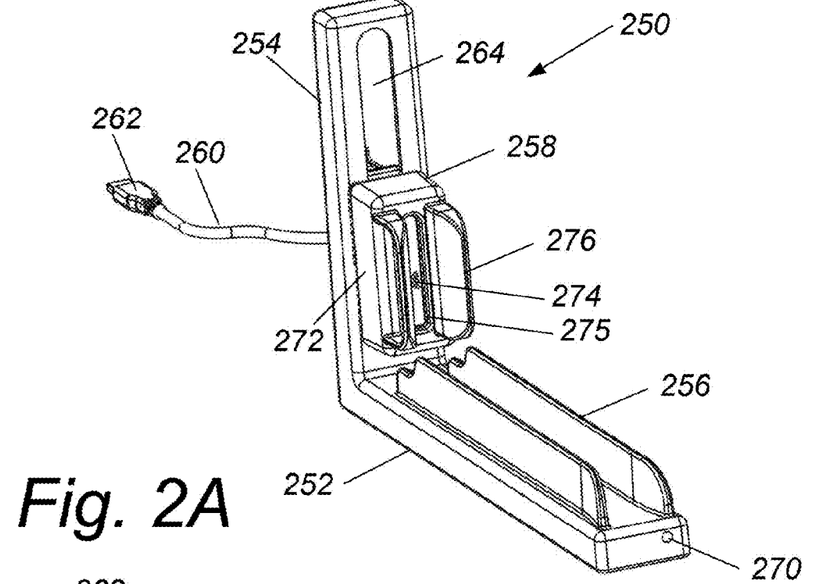
FIG. 2A is a side perspective view of one embodiment of a slide dock to receive a portable electronic device, optionally with the cover of FIG. 1A, according to the invention.
Figure 2B:
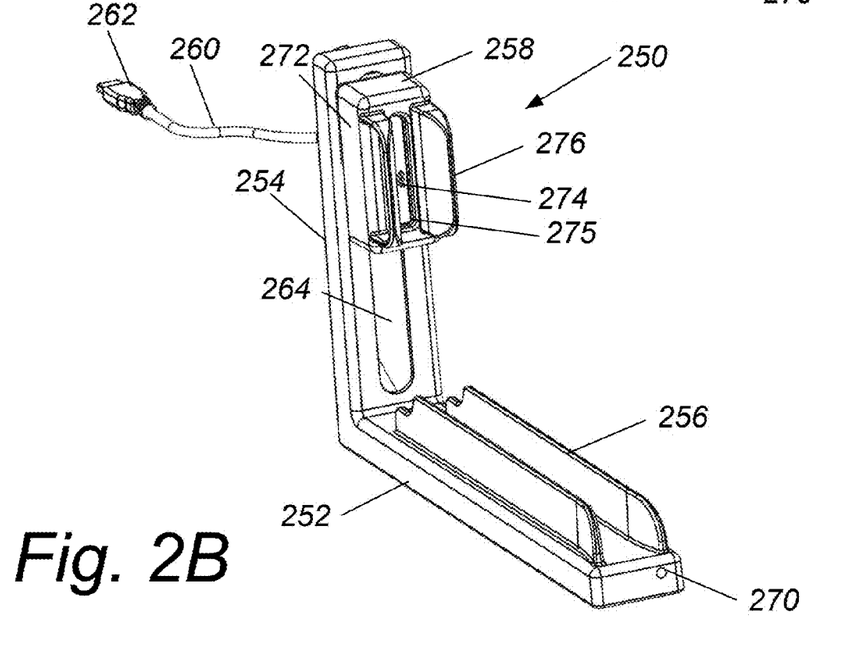
FIG. 2B is another side perspective view of the slide dock of FIG. 2A with a receiving arrangement in a different position, according to the invention.
Figure 2C:
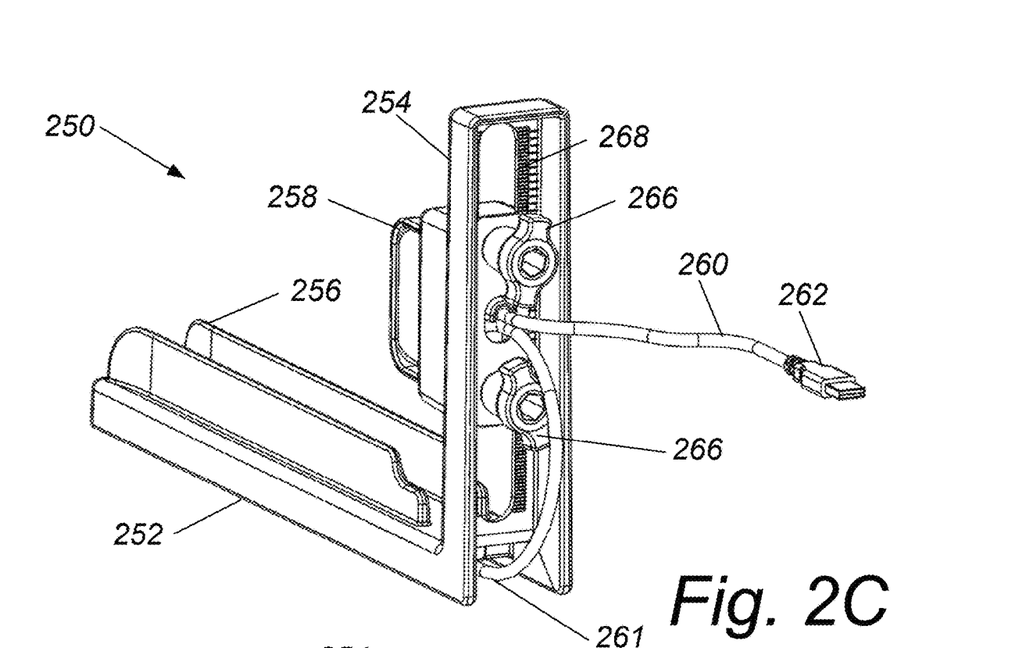
FIG. 2C is a back perspective view of the slide dock of FIG. 2A, according to the invention.
Figure 2D:
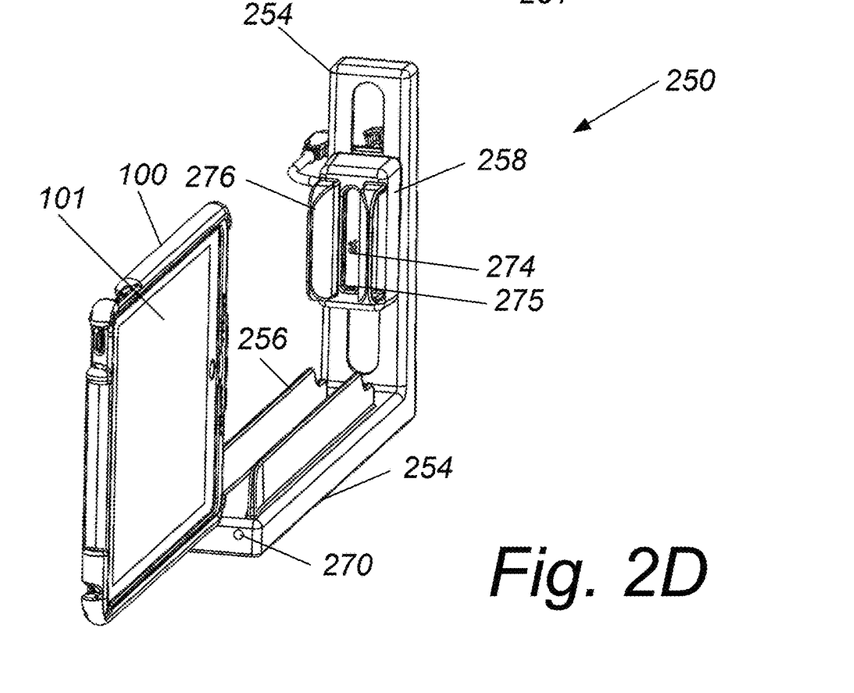
FIG. 2D is a front perspective view of the slide dock of FIG. 2A with a portable electronic device being inserted into the slide dock, according to the invention.

FIGS. 2A-2E illustrated one embodiment of a slide dock 250. The slide dock 250 includes a base 252, an arm 254 extending from the base, one or more guides 256 disposed on the base, a receiving arrangement 258 coupled to the arm, a cable 260 extending from the receiving arrangement 258, and a plug 262 attached to the cable. The slide dock 250 is designed to receive, and mate to, a portable electronic device 101 (FIG. 2D) with an optional cover 100 (FIG. 2D).

Figure 3A:
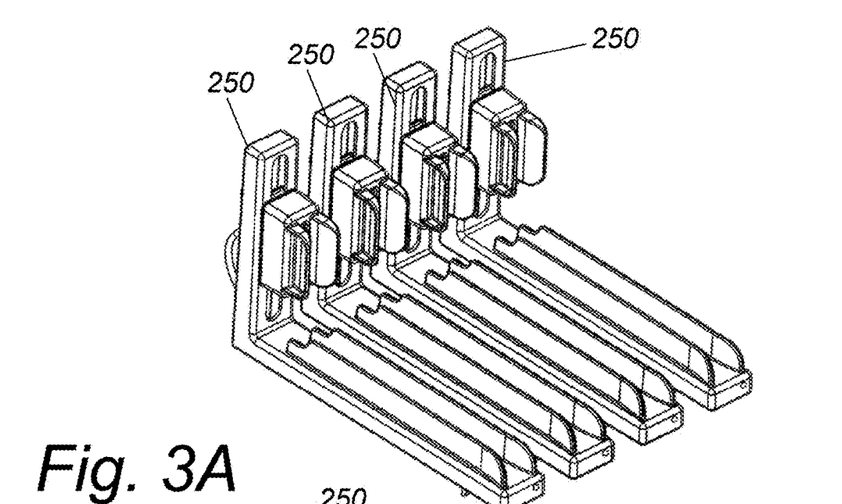
FIG. 3A is a side perspective view of multiple slide docks of FIG. 2A in a modular arrangement, according to the invention.
Figure 3B:
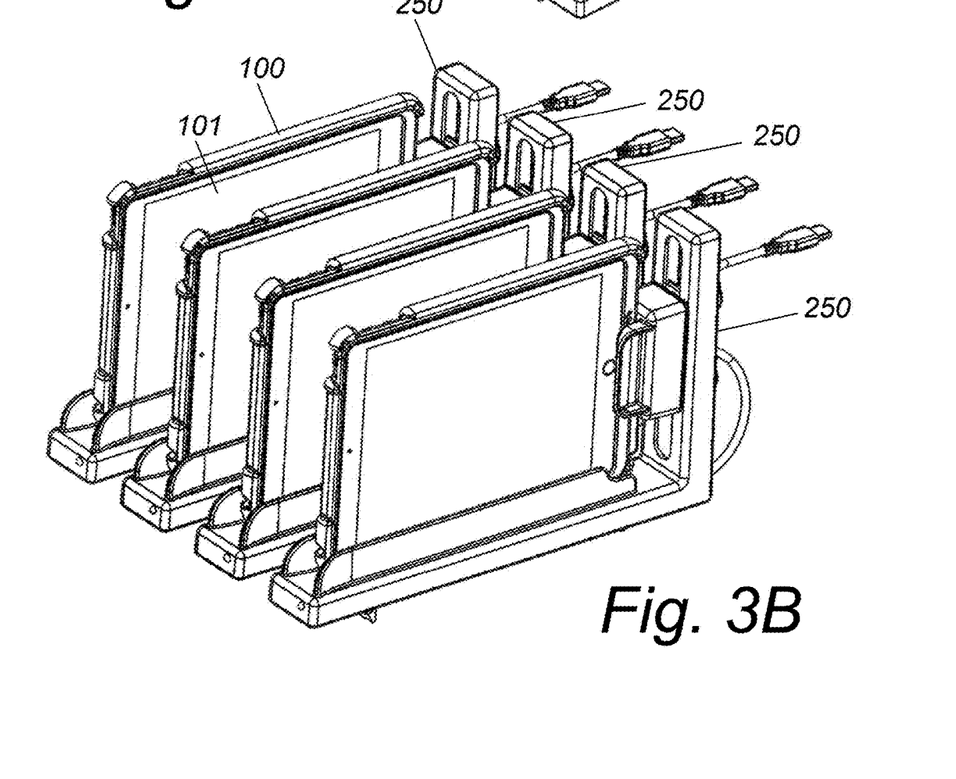
FIG. 3B is a side perspective view of multiple slide docks of FIG. 2A in a modular arrangement with a portable electronic device docked in each slide dock, according to the invention.

The base 252 can provide a resting surface for the portable electronic device and cover (see, for example, FIG. 3B). The one or more guides 256 extend from the base 252 and facilitate guiding and alignment of the portable electronic device with the receiving arrangement 258 and may also provide lateral support for the portable electronic device when docked.

The base 252 (or other portion of the slide dock 250) optionally includes a light 270. The light 270 can be used to indicate one or more of the following conditions: a portable electronic device is correctly docked in the slide dock; the portable electronic device is charging; the portable electronic device is sending data through the slide dock; the portable electronic device is receiving data through the slide dock; or the like or any combination thereof. In some embodiments, the light 270 is lit when one or more of the conditions are met. In some embodiments, the light 270 is unlit (or lit with a different color, such as red) if there is no portable electronic device in the slide dock (or if the portable electronic device is incorrectly inserted into the slide dock). In some embodiments, the light 270 is lit with a different color for different conditions (e.g., the light may be lit with a first color when charging and a second color when receiving or transmitting data). In some embodiments, the light 270 is lit with a first color (e.g., yellow or red) if the device is charging and is lit with a second color (e.g., green) if the device is fully charged (or charged to at least a threshold amount). In at least some embodiments, a cable 261 (FIG. 2C) extends from the receiving arrangement 258 to the light 270 to control operation of the light.

In the illustrated embodiments, the arm 254 extends orthogonally from the base 252, although other arrangements of the arm and base are also possible. The receiving arrangement 258 is coupled to the arm 254. In the illustrated embodiments, the position of the receiving arrangement 258 along the arm 254 is adjustable so that the slide dock 250 can be used with portable electronic devices of different sizes. FIGS. 2A and 2B illustrate the receiving arrangement 258 at two different positions along the arm 254. In other embodiments, the receiving arrangement 258 may be permanently fixed at a particular position along the arm 254.

To facilitate movement of the receiving arrangement 258, the arm 254 defines a slot 264. The receiving arrangement 258 includes one or more locking mechanisms 266 (FIG. 2C) that can be adjusted between a lock position (where the receiving arrangement 258 is fixed to the arm 254) and an unlocked position (where the receiving arrangement 258 can move relative to the arm 254.) In some embodiments, the arm 254 includes a ratcheting track 268 so that the receiving arrangement 258 can be positioned at multiple sites along the arm corresponding to the sites on the track 268. Optionally, the arm may include numbering (not shown) along the track so that a user can identify which site the receiving arrangement 258 is coupled. This can facilitate aligning the receiving arrangement 258 along the arm 254 for a particular portable electronic device based on the size of the device and knowledge regarding which number along the track the receiving arrangement 258 should be placed. For example, a user may determine which number corresponds to a particular portable electronic device and then arrange other slide docks similarly to create a modular arrangement of slide docks (see, for example, FIG. 6) that can all receive the same type of portable electronic device.

Figure 2E:
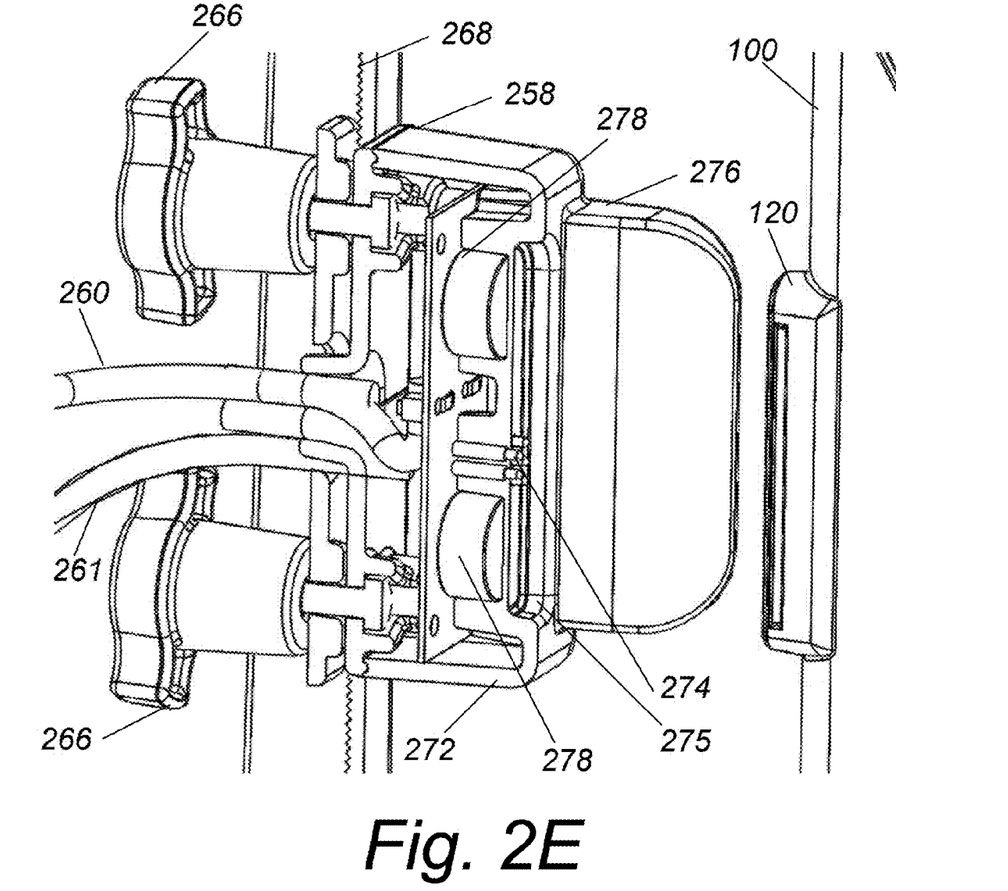
FIG. 2E is a close-up view of a portion of the slide dock of FIG. 2A with a cut-away view of a portion of the receiving arrangement, according to the invention.

The receiving arrangement 258 includes a housing 272 with optional guides 276 extending from the housing and contacts 274 disposed on the exterior of the housing 272 for mating with contacts on the cover or portable electronic device. FIG. 2E provides a cut-away view of the interior of the housing 272. The contacts 274 are coupled to the cable 260 through, for example, pins, a circuit board, or any combination thereof, or any other suitable arrangement. In some embodiments, the housing 272 can include magnets 278 that can be arranged to attract similar magnets in the contactor of the cover to facilitate alignment of the contacts on the cover with the contacts 274 on the receiving arrangement 258.

The receiving arrangement 258 and contacts 274 can be arranged similar to the docking cradles described in U.S. Pat. Nos. 9,195,270 and 9,331,444; U.S. Patent Applications Publications Nos. 2016/0065702; 2015/0358439; 2015/0301561; and 2016/0070300; and PCT Patent Application Publication No. WO 2015/127376, incorporated herein by reference. For example, the receiving arrangement can include a docking connector with a recessed rim 275 that can receive the contact 120 (FIG. 1B) of the cover 100. The contacts 274 can be any suitable contacts including, but not limited to, biasing contacts, such as biasing pins, biasing pogo pins, or biasing leaf springs; wire or pin tips; or the like.

In at least some embodiments, the receiving arrangement 258 may also be rotatable relative to the arm 254 so that, for example, the receiving arrangement 258 can be disposed in either of two positions (180 degrees apart) relative to the arm. This can be particularly useful where the arrangement of contacts 274 is asymmetric, as in the illustrated embodiment. For example, the illustrated embodiment has the contacts arranged in two columns with one column having three contacts and the other column having two contacts. A user can rotate the receiving arrangement 258 between the two positions (separated by 180 degrees of rotation) so that the left column can have either three contacts (first position) or two contacts (second position—rotated 180 degrees from first position).

The cable 260 optionally includes a plug 262 than can be coupled to a charging station, hub, or other device through which charging power, data, or any combination thereof can be provided to the slide dock 250 and any portable electronic device coupled to the slide dock. The plug 262 can be any suitable plug including, but not limited to, a USB connector, micro-USB connector, a Lightning™ connector, a male or female wall socket or extension cord connector, or any other suitable connector. Alternatively, the cable 260 may be directly coupled to the charging station, hub, or other device without a plug.

Figure 6:
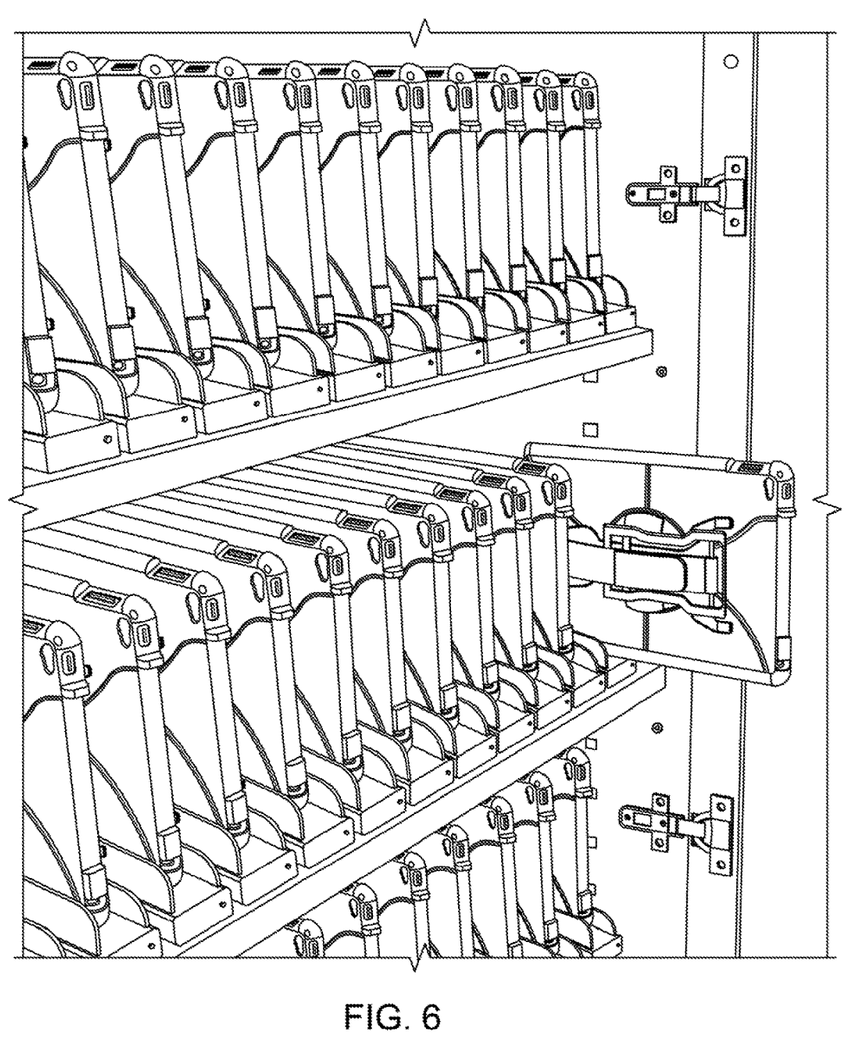
FIG. 6 is a view of multiple slide docks in a two-dimensional array in a closet or cupboard, according to the invention.

The slide dock 250 can be used in a modular arrangement to provide a docking station for multiple portable electronic devices, as illustrated in FIGS. 3A and 3B. FIG. 6 illustrates a closet or cupboard with multiple slide docks 250 arranged in a two dimensional array. The slide docks 250 can also be arranged in a cart or other device for charging or data transmission/reception.

Figure 4:
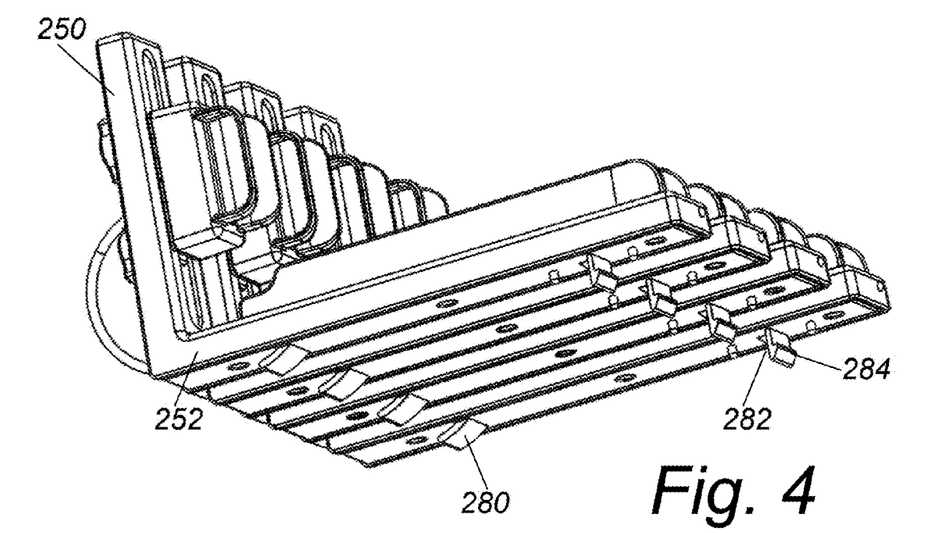
FIG. 4 is a bottom perspective view of one embodiment of multiple slide docks of FIG. 2A in a modular arrangement, according to the invention.

To facilitate arrangement or placement of the slide dock 250, the base 252 may have additional components. FIG. 4 illustrates one arrangement in which the base 252 has multiple extensions 280, 282 that can engage portions of a shelf or other resting surface to fix the base 252 to the shelf. In the embodiments of FIG. 4, the extension 280 can slide through an opening in the shelf and engage a bottom surface of the shelf. Extension 282 is a prong with a lip 284 that can fit through an opening in the shelf and engage the bottom surface of the shelf to hold the slide dock 250 in place on the shelf. In some embodiments, this allows the slide dock 250 to engage a shelf (or the like) by sliding the extension 280 into an opening in the shelf and then snapping the extension 282 into a second opening of the shelf.

Figure 5:
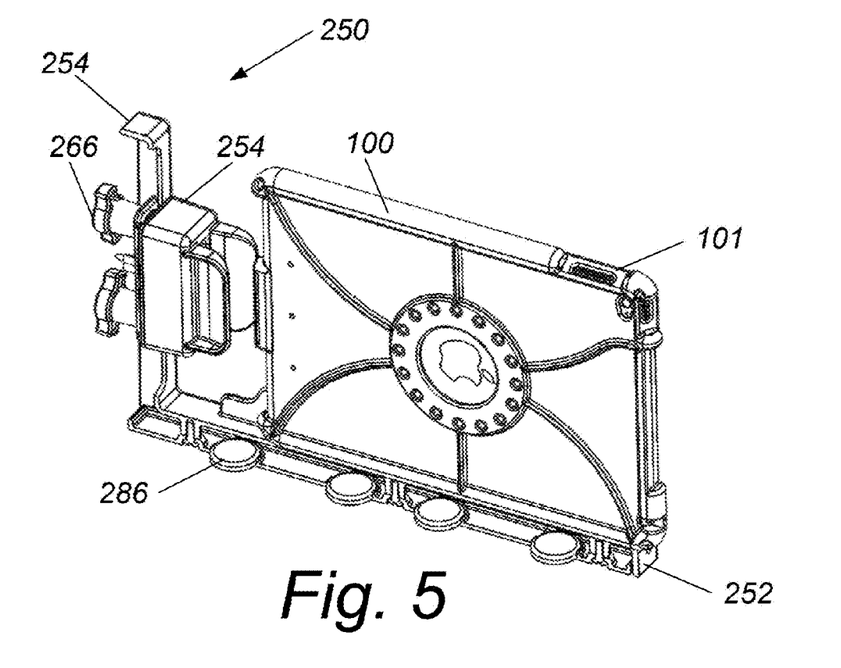
FIG. 5 is a bottom perspective view (and partially cut-away) of another embodiment of the slide dock of FIG. 2A with magnets in the base, according to the invention.

FIG. 5 illustrates another arrangement that includes magnets 286 in the base 250. The magnets 286 can fix the slide dock 250 to suitable metal shelves or other metal surfaces or to surfaces with corresponding magnets or magnetic material embedded or disposed on the surface. It will be recognized that other embodiments can utilize screws, bolts, nails, adhesive, or any other suitable fasteners to attach the base 252 of a slide dock 250 to a surface.

The above specification and examples provide a description of the invention and its manufacture and use. Since many embodiments of the invention can be made without departing from the spirit and scope of the invention, the invention also resides in the claims hereinafter appended.

What is claimed is:

1. A dock for a portable electronic device, the dock comprising:
   a base;
   an arm extending from the base;
   a receiving arrangement coupled to the arm and comprising a housing, a pair of guides extending from the housing, and a plurality of contacts disposed on a surface of the housing of the receiving arrangement for mating with contacts disposed on the portable electronic device or a cover disposed over a portion of the portable electronic device, wherein the receiving arrangement, including the pair of guides and plurality of contacts, is movable along a long axis of the arm, wherein the pair of guides are disposed directly opposite each other relative to the long axis of the arm with the plurality of contacts positioned directly between the pair of guides; and
   a cable extending from the receiving arrangement configured and arranged to couple the dock to a device for charging or providing data to or from the portable electronic device.

2. The dock of claim 1, wherein the base comprises at least one guide for guiding alignment of the portable electronic device with the receiving arrangement.

3. The dock of claim 1, wherein the arm comprises a ratcheting track to facilitate locking of the receiving arrangement to the arm.

4. The dock of claim 3, wherein the arm comprises numbering along the ratcheting track.

5. The dock of claim 1, wherein the receiving arrangement is rotatable relative to the arm between two positions that are 180 degrees apart.

6. The dock of claim 1, wherein the receiving arrangement comprises a recessed rim around the contacts.

7. The dock of claim 1, wherein the receiving arrangement comprises at least one magnet configured and arranged to facilitate alignment and coupling of the portable electronic device to the dock.

8. The dock of claim 1, wherein the base comprises at least one extension for coupling to an opening in a surface to which the base is to be attached.

9. The dock of claim 1, wherein the base comprises at least one magnet to facilitate coupling the base to a surface.

10. The dock of claim 1, wherein the base comprises two opposing guides for guiding and alignment of the portable electronic device.

11. The dock of claim 1, further comprising a light configured and arranged to indicate that a portable electronic device is correctly docked in the dock.

12. The dock of claim 11, wherein the light is unlit when there is no portable electronic device in the dock.

13. A storage and charging system for a plurality of portable electronic devices, comprising:
   a plurality of the docks of claim 1 arranged in at least one row.

14. The storage and charging system of claim 13, wherein the plurality of the docks is arranged in two dimensional array.

15. The storage and charging system of claim 13, further comprising a housing for the plurality of docks.

16. The storage and charging system of claim 15, wherein the housing is a cart, cupboard, or cabinet.

17. The storage and charging system of claim 15, wherein the housing comprises at least one shelf and each of the docks comprises at least one extension to engage the at least one shelf.

18. The storage and charging system of claim 13, further comprising a plurality of portable electronic devices configured and arranged to be received by the docks and charged using the docks.

19. The dock of claim 11, wherein the light is further configured and arranged to indicate that the portable electronic device is charging.

20. The dock of claim 11, wherein the light is further configured and arranged to indicate that the portable electronic device is sending data through the dock or that the portable electronic device is receiving data through the dock.

* * * * *